United States Patent
Ikeda

(10) Patent No.: US 9,369,698 B2
(45) Date of Patent: Jun. 14, 2016

(54) IMAGING APPARATUS AND METHOD FOR CONTROLLING SAME

(71) Applicant: CANON KABUSHIKI KAISHA, Tokyo (JP)

(72) Inventor: Yasuyuki Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 238 days.

(21) Appl. No.: 13/731,685

(22) Filed: Dec. 31, 2012

(65) Prior Publication Data

US 2013/0176408 A1   Jul. 11, 2013

(30) Foreign Application Priority Data

Jan. 6, 2012  (JP) ................................ 2012-001336

(51) Int. Cl.
*H04N 13/04* (2006.01)
*H04N 13/00* (2006.01)
*H04N 13/02* (2006.01)

(52) U.S. Cl.
CPC ........... *H04N 13/04* (2013.01); *H04N 13/0048* (2013.01); *H04N 13/0217* (2013.01)

(58) Field of Classification Search
None
See application file for complete search history.

(56) References Cited

U.S. PATENT DOCUMENTS

| | | | |
|---|---|---|---|
| 4,410,804 A | | 10/1983 | Stauffer |
| 5,340,978 A | * | 8/1994 | Rostoker et al. ........... 250/208.1 |
| 5,519,205 A | * | 5/1996 | Rostoker .................... 250/208.1 |
| 6,212,302 B1 | | 4/2001 | Honsinger et al. |
| 7,398,479 B2 | * | 7/2008 | Hooper ............. G06F 17/30265 |
| | | | 707/999.1 |
| 8,300,962 B2 | * | 10/2012 | Tago ...................... H04N 5/772 |
| | | | 382/232 |
| 8,619,180 B2 | * | 12/2013 | Kimura .................... G02B 7/34 |
| | | | 348/345 |
| 8,754,842 B2 | * | 6/2014 | Ludwig .................... H04N 7/14 |
| | | | 345/104 |

(Continued)

FOREIGN PATENT DOCUMENTS

JP   58-024105        2/1983
JP   2004-356997 A   12/2004

(Continued)

OTHER PUBLICATIONS

CIPA ("CIPA DC-006-2008 Stereo Still Image Format for Digital Cameras", http://www.cipa.jp/std/std-sec/std-list_e.html, Aug. 8, 2008).*

(Continued)

*Primary Examiner* — Tracy Li
*Assistant Examiner* — Mohammad J Rahman
(74) *Attorney, Agent, or Firm* — Cowan, Liebowitz & Latman, P.C.

(57) ABSTRACT

The imaging element of the imaging apparatus is provided with pixels respectively having multiple photoelectric conversion units that generate image signals by photoelectrically converting light fluxes that transit different regions dividing an exit pupil of an imaging optical system to a single micro lens. The imaging apparatus generates left-eye image data and right-eye image data for three-dimensional display based on image signals output by the imaging element, and generates combined image data for two-dimensional display by additively combining the left-eye image data and the right-eye image data. The imaging apparatus compresses the combined image data at a first compression rate, compresses the left-eye image data and the right-eye image data at a second compression rate that is higher than the first compression rate, and records the respectively compressed image data in the same image file.

15 Claims, 10 Drawing Sheets

(56) References Cited

U.S. PATENT DOCUMENTS

| | | | | |
|---|---|---|---|---|
| 2004/0169751 A1* | 9/2004 | Takemura | ............ | H04N 1/2112 348/294 |
| 2005/0044066 A1* | 2/2005 | Hooper et al. | ............. | 707/3 |
| 2007/0139534 A1* | 6/2007 | Tsushio | ............ | H04N 1/2112 348/231.99 |
| 2007/0174545 A1* | 7/2007 | Okada | ............ | G06F 3/0605 711/112 |
| 2007/0296865 A1* | 12/2007 | Mino | ............ | G09G 3/2007 348/571 |
| 2009/0027487 A1 | 1/2009 | Misawa | | |
| 2010/0195920 A1* | 8/2010 | Tago | ............ | 382/232 |
| 2010/0265351 A1* | 10/2010 | Kaibara | ............ | G06F 17/30244 348/222.1 |

FOREIGN PATENT DOCUMENTS

| | | |
|---|---|---|
| JP | 2005-269022 A | 9/2005 |
| JP | 2009-021989 A | 1/2009 |
| JP | 2010-200354 | 9/2010 |
| JP | 2010-268492 A | 11/2010 |
| WO | 2012/002297 A1 | 1/2012 |
| WO | 2012/002430 A1 | 1/2012 |

OTHER PUBLICATIONS

The above foreign patent documents were cited in a Jun. 12, 2015 Chinese Office Action, which is enclosed with an English Translation, that issued in Chinese Patent Application No. 201310001275.2.

The above foreign patent documents were cited in the Aug. 11, 2015 Japanese Office Action, which is enclosed with an English Translation, that issued in Japanese Patent Application No. 2012001336.

White Paper of CIPA DC-006-2008, Stereo Still Image Format for Digital Cameras, Camera & Imaging Products Association, Aug. 8, 2008.

The above patent document was cited in the Chinese Office Action, which is enclosed with an English Translation, that issued in Chinese Patent Application No. 201310001275.2.

* cited by examiner

IMAGING APPARATUS AND METHOD FOR CONTROLLING SAME

BACKGROUND OF THE INVENTION

1. Field of the Invention

The present invention relates to an imaging apparatus, and an imaging apparatus control method.

2. Description of the Related Art

In recent years, there has been a rapid increase in the prevalence of devices associated with stereoscopic images such as three-dimensional (3D) cinema, 3D display, and the like. Conventionally, photographing of stereoscopic images has been carried out by film cameras and the like. However, with the prevalence of digital imaging apparatuses, it has become common to photograph original images for generation of stereoscopic images using digital cameras, digital video cameras, and the like.

As a mechanism by which a user views a stereoscopic image, data for a right-eye image and a left-eye image with parallax in the left-right direction is prepared so as to correspond to an image of the object viewed with the left eye and an image of the object viewed with the right eye. A user can view stereoscopic images by viewing each image with his/her right eye and left eye, respectively. Examples of such a method include methods for dividing a parallax image to be viewed, such as a parallax barrier method, a lenticular method, or the like. There is also known to be a method for providing different images to the left eye and the right eye of a user via a filter having different characteristics between the left and right sides thereof.

On the other hand, as a method for capturing an image which is viewable as a stereoscopic image, Japanese Patent Laid-Open No. 58-24105 discloses a method for simultaneously capturing images at different viewpoints. Japanese Patent Laid-Open No. 58-24105 discloses a solid-state imaging element in which multiple micro lenses are formed, and at least one pair of photodiodes is arranged close to each of the micro lenses.

Of the pair of photodiodes, a first image signal is obtained from the output of one photodiode and a second image signal is obtained from the output of the other photodiode. A user can view a stereoscopic image by using the first and second image signals as a left-eye image and a right-eye image, respectively. It would also be conceivable to have an imaging apparatus in which a combined image is generated based on the aforementioned first image signal and second image signal, and the generated combined image is recorded as an image for two-dimensional display.

In this instance, although an imaging apparatus could manage a left-eye image and a right-eye image as separate files, it would become impossible to view a stereoscopic image if one of the files were lost. Japanese Patent Laid-Open No. 2010-200354 discloses an image file generation method which records a left-eye image and a right-eye image in the same file.

Applying the image file generation method disclosed in Japanese Patent Laid-Open No. 2010-200354, it would be conceivable to have an imaging apparatus in which a left-eye image, a right-eye image, and a combined image are recorded in one file. However, the file size would be large if such an imaging apparatus were used.

SUMMARY OF THE INVENTION

The imaging apparatus of the present invention is an imaging apparatus in which a left-eye image, a right-eye image, and a combined image data are recorded in one file, and the file size of the recorded image data is minimized.

The imaging apparatus of an aspect of the present invention includes: an imaging element provided with pixels which respectively have multiple photoelectric conversion units that generate image signals by photoelectrically converting light fluxes that transit different regions of exit pupil of an imaging optical system to one micro lens; an image generation unit configured to generate left-eye image data and right-eye image data for three-dimensional display based on image signals output by the imaging element, and generate combined image data for two-dimensional display by additively combining the generated left-eye image data and right-eye image data; an image compression unit configured to compress the combined image data at a predetermined first compression rate, and compress the left-eye image data and the right-eye image data at a second compression rate that is higher than the first compression rate; and an image recording unit configured to record the compressed combined image data, left-eye image data, and right-eye image data in the same image file.

According to the imaging apparatus of the present invention, it is possible to achieve efficient file management by recording a left-eye image, a right-eye image, and a combined image in one file, and minimize the file size of the recorded images.

Further features of the present invention will become apparent from the following description of exemplary embodiments with reference to the attached drawings.

DESCRIPTION OF THE EMBODIMENTS

As stated above, to view a stereoscopic image, it is necessary to utilize a left-eye image and a right-eye image, and recording these images in the same file enables efficient file management.

Now, an imaging apparatus provided with an imaging element having multiple photodiodes corresponding to a single micro lens may conceivably conduct the following processing. For example, this imaging apparatus utilizes a combined image that is generated by combining a left-eye image and a right-eye image for a two-dimensional display image, and utilizes the left-eye image and right-eye image for a three-dimensional display image. Recording these images in the same file enables efficient file management, but there is the problem that three images are recorded in the same file, increasing the file size. According to the imaging apparatus of the present embodiment described below, the aforementioned problem can be solved.

Figure 1:
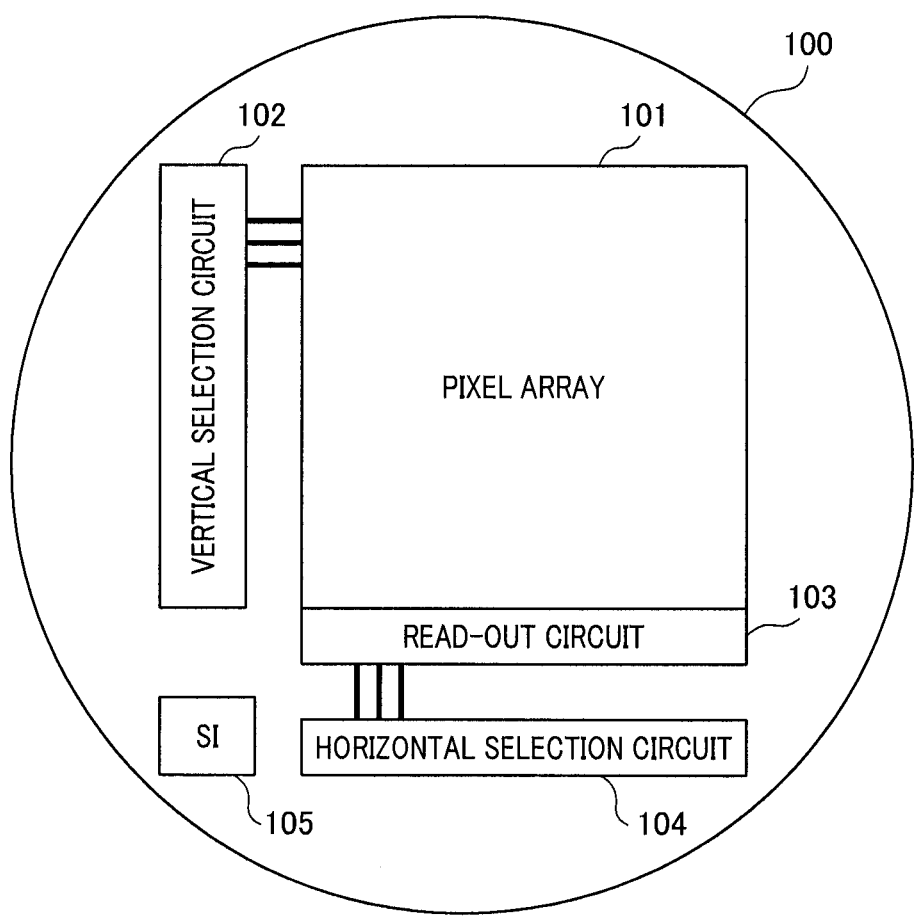
FIG. 1 schematically illustrates an exemplary configuration of an imaging element applied by the imaging apparatus.

FIG. 1 schematically illustrates an exemplary configuration of an imaging element applied by the imaging apparatus of the present embodiment. An imaging element 100 includes a pixel array 101, a vertical selection circuit 102 which selects a row in the pixel array 101, and a horizontal selection circuit 104 which selects a column in the pixel array 101. A read-out circuit 103 reads out the signal of a pixel selected by the vertical selection circuit 102 from among the pixels in the pixel array 101. The read-out circuit 103 has a memory for storing the signals, a gain amplifier, an AD converter, and the like for each column.

A serial interface (SI) unit 105 determines the operational mode of each circuit according to instructions from an external circuit. The vertical selection circuit 102 sequentially selects multiple rows of the pixel array 101, and extracts the pixel signals to the read-out circuit 103. The horizontal selection circuit 104 sequentially selects the multiple pixel signals read by the read-out circuit 103 for each column. In addition to the components shown in FIG. 1, the imaging element 100 has, for example, a timing generator that provides a timing signal to the vertical selection circuit 102, the horizontal selection circuit 104, the read-out circuit 103, and the like, and a control circuit, but a detailed description thereof will be omitted.

Figure 2A:
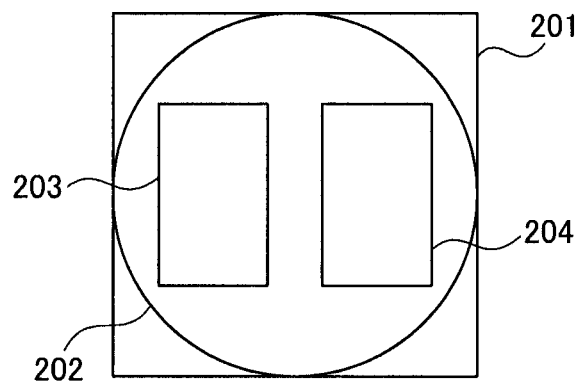
FIG. 2A and FIG. 2B illustrate exemplary configurations of a pixel of an imaging element.
Figure 2B:
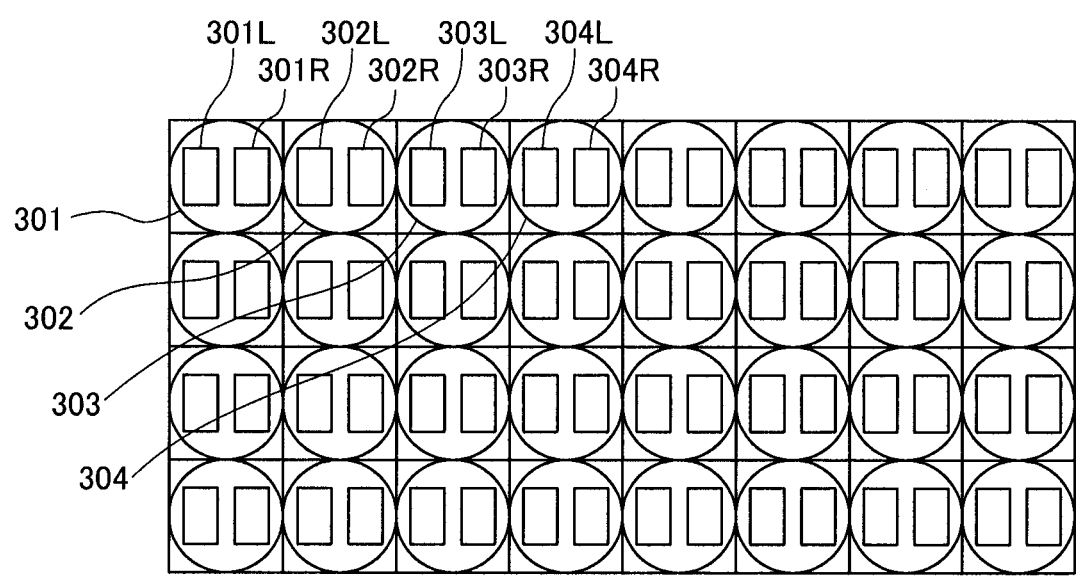

FIGS. 2A and 2B are diagrams illustrating an exemplary configuration of a pixel of the imaging element 100. FIG. 2A schematically shows the configuration of a single pixel. FIG. 2B shows the arrangement of the pixel array 101. A pixel 201 shown in FIG. 2A has a micro lens 202 serving as an optical element, and multiple photodiodes (hereinafter abbreviated as "PD") serving as light-receiving elements.

FIG. 2A shows an example where a left-side PD 203 and a right-side PD 204 are provided in one pixel, but three or more (e.g., four or nine) PDs may also be used. The PD 203 photoelectrically converts a received light flux to output a left-eye image. The PD 204 photoelectrically converts a received light flux to output a right-eye image. In the description which follows, the PD of the left side is also denoted as the left-side PD, and the PD of the right side is also denoted as the right-side PD. In addition to the illustrated components, the pixel 201 includes, for example, a pixel amplifier which extracts PD signals to the read-out circuit 103, a row selection switch, and a PD signal reset switch.

In order to provide a two-dimensional image, the pixel array 101 is configured in a two-dimensional array layout as with the multiple pixels 301 to 304 shown in FIG. 2B. The PDs 301L, 302L, 303L, and 304L respectively correspond to the PD 203 of FIG. 2A, and the PDs 301R, 302R, 303R, and 304R respectively correspond to the PD 204 of FIG. 2A. That is, the imaging apparatus of the present embodiment is provided with an imaging element which includes multiple pixels that respectively have a first photoelectric conversion unit (PD 203) for outputting a left-eye image, and a second photoelectric conversion unit (PD 204) for outputting a right-eye image.

Figure 3:
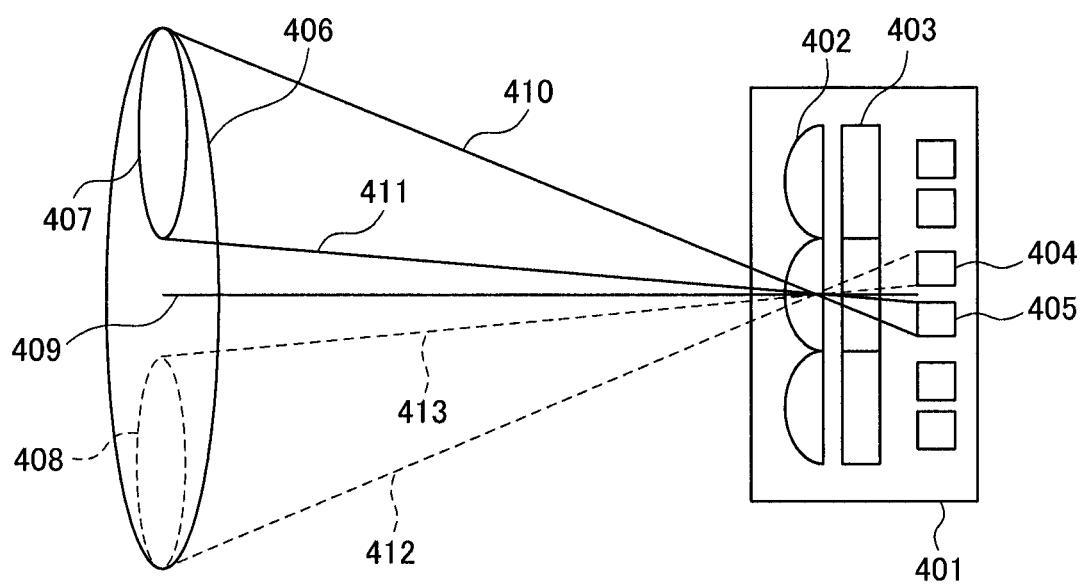
FIG. 3 is a conceptual diagram which depicts how light fluxes emitted from the exit pupil of a photographic lens enter an imaging element.

Next, a description is given of the light receiving of the imaging element 100 having the pixel configuration shown in FIG. 2B. FIG. 3 is a conceptual diagram depicting how light fluxes emitted from an exit pupil of a photographic lens enter the imaging element 100.

The pixel array 101 has a micro lens 402, a color filter 403, and PDs 404 and 405. The PDs 404 and 405 respectively correspond to the PDs 203 and 204 of FIG. 2A.

In FIG. 3, the center of the light flux that is emitted from an exit pupil 406 of a photographic lens to the micro lens 402 constitutes an optical axis 409. The light emitted from the exit pupil 406 enters the imaging element 100 centered on the optical axis 409. The partial regions 407 and 408 are regions of the exit pupil 406 of the photographic lens. Light beams 410 and 411 are the outermost peripheral light beams of the light passing through the partial region 407. Light beams 412 and 413 are the outermost peripheral light beams of the light passing through the partial region 408.

Among the light fluxes emitted from the exit pupil 406, the upper light flux enters the PD 405 and the lower light flux enters the PD 404, with the optical axis 409 serving as the boundary. In short, the PD 404 and the PD 405 each receive a light flux from a different region of the exit pupil of the photographing optical system. As each light-receiving element detects light of a different region in the exit pupil in this manner, they obtain photographic images of respectively different shape, in a condition where light from a point light source is captured in a blurred state.

Figure 4:
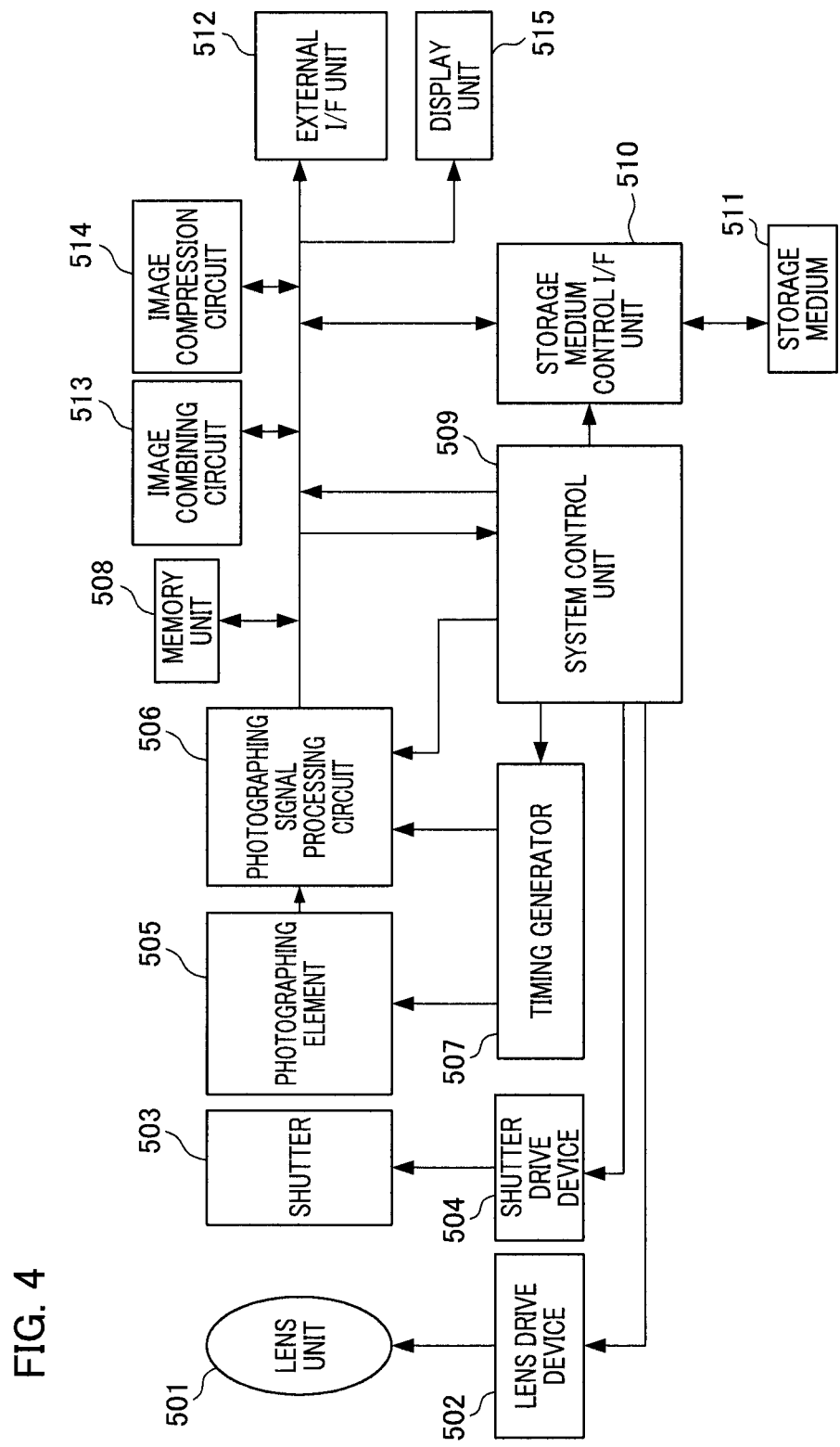
FIG. 4 illustrates an exemplary configuration of the imaging apparatus of the present embodiment.

FIG. 4 is a diagram which illustrates an exemplary configuration of the imaging apparatus of the present embodiment. With reference to FIG. 4, a description will be given of an exemplary application of the imaging element 100 shown in FIG. 1 to a digital camera that is an imaging apparatus. A lens unit 501 constituting the imaging optical system focuses the light from an object on an imaging element 505. The imaging element 505 corresponds to the imaging element 100 shown in FIG. 1, and has the pixel configuration shown in FIG. 2B.

A lens drive device 502 performs zoom control, focus control, diaphragm control, and the like. A mechanical shutter 503 is controlled by a shutter drive device 504. The imaging element 505 converts an object image focused by the lens unit 501 into an image signal. An imaging signal processing circuit 506 performs various types of processing or correction on the image signals output by the imaging element 505. A timing generator 507 outputs timing signals required by the imaging element 505 or the imaging signal processing circuit 506.

A system control unit 509 is a control unit that performs various computations, and that controls the imaging apparatus in its entirety. Processing by the system control unit 509 is realized by which a CPU (Central Processing Unit) (not shown) provided in the imaging apparatus executes programs. A memory unit 508 includes a memory that temporarily stores image data. A recording medium control interface unit (hereinafter abbreviated as "I/F unit") 510 is provided for recording/reading image data or the like on/from a recording medium 511. The recording medium 511 which is detachable from the imaging apparatus is a semiconductor memory or the like. An external I/F unit 512 transmits/receives data to/from an external device.

The imaging signal processing circuit 506 performs various types of correction and image processing with respect to image signals output by the imaging element 505. The memory unit 508 temporarily stores output data from the imaging signal processing circuit 506, combined images generated by the image combining circuit 513, and the like. The image combining circuit 513 generates a combined image. An image compression circuit 514 functions as an image compression unit that compresses image signals. The display unit 515 displays various types of information as well as captured images. The control method of the imaging apparatus of the present embodiment is realized by the function of the each processing unit provided in the imaging apparatus shown in FIG. 4.

Next, a description is given of the operations of the digital camera during photographing. When the main power supply is turned on, the power supply of a control system circuit unit is turned on, and the power supply of an imaging processing system circuit such as the imaging signal processing circuit 506 is also turned on. When a user operates a release button (not shown), the system control unit 509 computes focus state detection based on data from the imaging element 505 to calculate the distance from the imaging apparatus to the object. Subsequently, the lens drive device 502 drives the movable lens of the lens unit 501, and the system control unit 509 determines whether or not the focus state is in-focus.

When the system control unit 509 determines that the focus state is not in-focus, it controls the driving of the lens unit 501 again to execute focus state detection processing. For computation of the distance to the object, in addition to a method for calculating the distance from data of the imaging element 505, a method may also be used which uses a distance measuring dedicated device (not shown). The system control unit 509 initiates photographing operation after determining that the focus state is in-focus. When the photographing operation is completed, the imaging signal processing circuit 506 processes the image signal output by the imaging element 505, and the system control unit 509 controls the writing of the image data to the memory unit 508.

Image data output by the imaging element 505 is output as image signals from the multiple PDs. In the example shown in FIG. 2B, image signals are output in the sequence of PD 301L, 301R, 302L, 302R, 303L, 303R, 304L, and 304R. The image signal processing circuit 506 conducts image processing by allocating the imaging data output by the imaging element 505 to left-eye image data and right-eye image data. Left-eye image data is image data obtained as a result of selecting and processing only the output (left-eye image signals) from the left-side PDs 301L, 302L, 303L, and 304L shown in FIG. 2B.

Right-eye image data is image data obtained as a result of selecting and processing only the output (right-eye image signals) from the right-side PDs 301R, 302R, 303R, and 304R shown in FIG. 2B. Left eye image data and right-eye image data are separately retained in the memory unit 508.

The image combining unit 513 reads the respective data for a left-eye image and a right-eye image retained in the memory unit 508, and generates a combined image. The generated combined image data is stored in the memory unit 508. Image processing executed by the image combining unit 513 is processing in which an additive mean value for each pixel of a left-eye image and a right-eye image is calculated. Accordingly, the shape of the object is interpolated by this image processing. The combined image generated thereby has a shape reflecting the shape of an object. For example, in the case where the shape of the object is circular, and where the left-eye image and the right-eye image are semicircular, the combined image will have a circular shape identical to the shape of the object. That is, the imaging signal processing circuit 506 and the image combining unit 513 function as an image generation unit that executes the following processing. This image generation unit generates left-eye image data and right-eye image data for three-dimensional display based on the image signals output by the imaging element 505, and generates combined image data for two-dimensional display by additively combining the pertinent generated left-eye image data and right-eye image data.

Even when photographing is conducted with the imaging element 505 in a state where the shape of the object is different between a left-eye image and a right-eye image, the shape of the object image is interpolated by the image processing through the image combining unit 513, resulting in generation of image data with the correct shape. Note that the image signal processing circuit 506 may also combine the left-eye image and the right-eye image after image processing has been conducted.

By means of the above-described processing, the memory unit 508 stores a left-eye image, a right-eye image, and a combined image generated by the image combining circuit 513. Next, the system control unit 509 reads the respective images stored in the memory unit 508. The image compression circuit 514 then conducts JPEG compression of the images that are read, and again writes them into the memory unit 508 as display images. Thereafter, the system control unit 509 records the images written into the memory unit 508 in a detachable recording medium 511 such as a semiconductor memory via the recording medium control I/F unit 510. Note that the system control unit 509 may also conduct direct input into an external computer or the like via the external I/F unit 512.

(First Embodiment)

Figure 5:
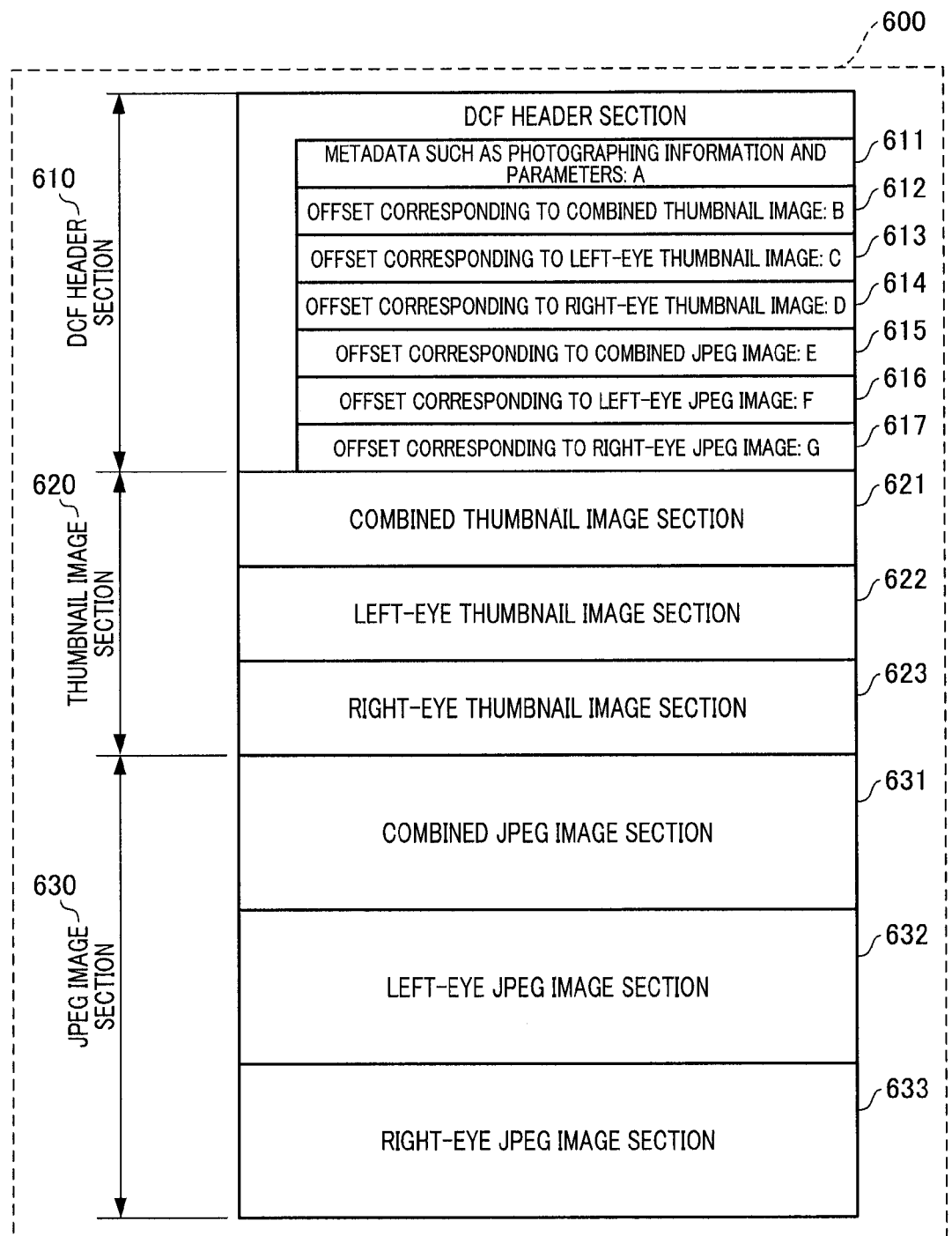
FIG. 5 illustrates an example of a file structure of image data.

A first embodiment is described below. An imaging apparatus of the first embodiment compresses a combined image at a predetermined first compression rate, and compresses a left-eye image and a right-eye image at a second compression rate that is higher than the first compression rate FIG. 5 is a diagram which illustrates an exemplary file structure of image data recorded by the imaging apparatus of the first embodiment. The imaging apparatus of the first embodiment records a left-eye image, a right-eye image, and a combined image in the memory unit 508 as an image data file 600. The image data file 600 has a DCF image data file format that is generically used in digital cameras. Specifically, the image data file 600 has the respective regions of a DCF header section 610, a thumbnail image section 620, and a JPEG image section 630.

The DCF header section 610 is a region in which DCF header information is stored, and is given a predetermined data size. The DCF header information contains metadata A (611) such as photographing information and parameters related to image data stored in the JPEG image section 630. The DCF header information also contains an offset value B (612) corresponding to a combined thumbnail image, an offset value C (613) corresponding to a left-eye thumbnail image, and an offset value D (614) corresponding to a right-eye thumbnail image. The DCF header information further contains an offset value E (615) corresponding to a combined JPEG image, an offset value F (616) corresponding to a left-eye JPEG image, and an offset value G (617) corresponding to a right-eye JPEG image. The starting positions of the respective image data are specified by the offset values B to G.

The thumbnail image section 620 stores thumbnail images which are used when the imaging apparatus conducts multiple image (index) display. Thumbnail images are images which have been resized by thinning JPEG images and the like stored in the JPEG image section 630. The thumbnail image section 620 has a combined thumbnail image section 621, a left-eye thumbnail image section 622, and a right-eye thumbnail image section 623.

The combined thumbnail image section 621 records a thumbnail image which is used when the imaging apparatus conducts two-dimensional display. The left-eye thumbnail image section 622 and the right-eye thumbnail image section 623 respectively record a left-eye thumbnail image and a right-eye thumbnail image which are used when the imaging apparatus conducts three-dimensional display.

The JPEG image section 630 is a region for storing JPEG images obtained by compression after the imaging apparatus has conducted image processing of raw images. JPEG images can be applied in numerous common applications.

The JPEG image section 630 has a combined JPEG image section 631, a left-eye JPEG image section 632, and a right-eye JPEG image section 633. The combined JPEG image section 631 records a JPEG image which is used when the imaging apparatus conducts two-dimensional display. The left-eye JPEG image section 632 and right-eye JPEG image section 633 respectively record a left-eye JPEG image and a right-eye JPEG image which are used when the imaging apparatus conducts three-dimensional display.

With the file structure shown in FIG. 5, while three types of JPEG images are stored in a single file, and the respective JPEG images are used for different applications. Accordingly, the imaging apparatus determines the compression rate of the respective JPEG images according to the application for which the JPEG image is used.

Note that the file structure of the image files recorded by the imaging apparatus is not limited to the file structure shown in FIG. 5. The imaging apparatus may also record image files having a file structure that modifies the sequence of the respective images shown in FIG. 5, according to various applications such as image editing.

Figure 6:
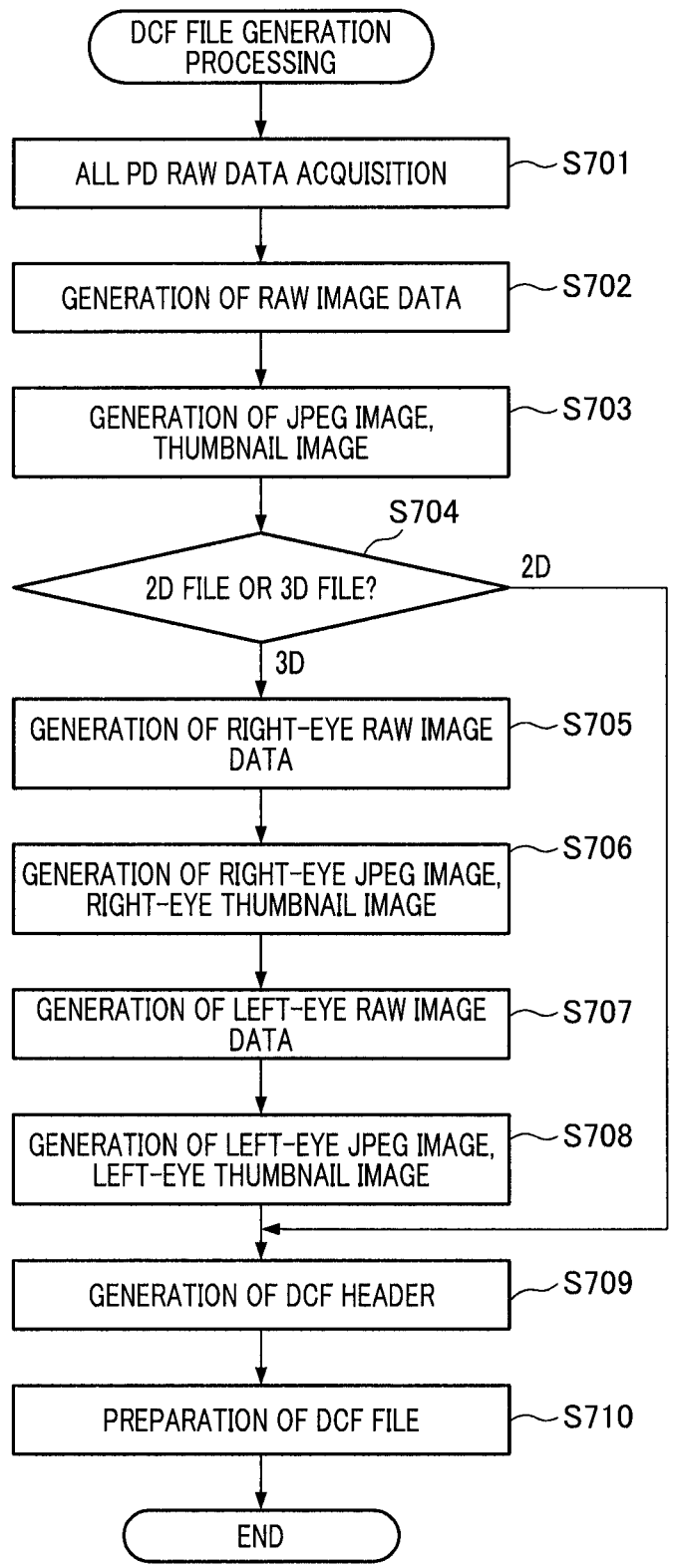
FIG. 6 is a flowchart which serves to describe an example of an image file generation process.

FIG. 6 is a flowchart describing an example of image file generation processing by the imaging apparatus of the first embodiment. In this example, the imaging apparatus generates a DCF file as the image file. First, the system control unit 509 obtains raw data from the right-side PDs and the left-side PDs of the imaging element 505. That is, the system control unit 509 obtains raw data from all of the PDs with which the imaging element is provided, and stores it in the memory unit 508 (step S701). In the present embodiment, the raw data obtained from all of the PDs is denoted as "all PD raw data".

Next, the imaging signal processing circuit 506 develops the all PD raw data of the memory unit 508 using development parameters for raw images, generates raw image data, and arranges it in the memory unit 508 (step S702). As this raw image data uses signals read out from all of the PDs, it can be recognized as image data of the correct shape even with objects for which the light of a point light source is captured in a blurred manner. In this example, for purposes of convenience, the image generated from all of the PDs uniting right-side PDs and left-side PDs is considered as the combined image. The raw image data generated in step S702 is also denoted as "combined raw image data". That is, instead of additively combining left-eye image data and right-eye image data, the imaging signal processing circuit 506 generates combined image data for two-dimensional display based on all of the image signals output by the imaging element 505.

Next, the imaging signal processing unit 506 develops the combined raw image data obtained in step S702 using the development parameters for JPEG images. Furthermore, the image compression circuit 514 generates a combined JPEG image and a combined thumbnail image by subjecting the pertinent development results to image compression at a prescribed compression rate (step S703). The processing to determine the compression rate to be applied in step S703 is described below.

Next, the system control unit 509 judges whether to generate an image file for two-dimensional display or an image file for three-dimensional display (step S704). The 3D image file defined here is a file with a format enabling treatment as both a two-dimensional image and a three-dimensional image. In the case where the system control unit 509 judges that an image file for three-dimensional display is to be generated, the process advances to step S705.

In step S705, the system control unit 509 inputs the all PD raw data obtained in step S701 into the imaging signal processing circuit 506, and the imaging signal processing circuit 506 extracts the raw data corresponding to the right-side PDs. By developing the extracted raw data using the development parameters for raw images, the imaging signal processing circuit 506 generates right-eye raw image data, and arranges it in the memory unit 508 (step S705).

Next, the imaging signal processing circuit 506 develops the right-eye raw image data in the memory unit 508 using the development parameters for JPEG images. The image compression circuit 514 then subjects the pertinent development results to image compression at a prescribed compression rate, thereby generating a right-eye JPEG image and a right-eye thumbnail image (step S706). The processing to determine the compression rate to be applied in step S706 is described below.

Next, the system control unit 509 inputs the all PD raw data obtained in step S701 into the imaging signal processing circuit 506, and the imaging signal processing circuit 506 extracts the raw data corresponding to the left-side PDs. By developing the extracted raw data using the development parameters for raw images, the imaging signal processing circuit 506 generates left-eye raw image data, and arranges it in the memory unit 508 (step S707).

Next, the imaging signal processing circuit 506 develops the left-eye raw image data in the memory unit 508 using the development parameters for JPEG images. The image compression circuit 514 then subjects the pertinent development results to image compression at a prescribed compression rate, thereby generating a left-eye JPEG image and a left-eye thumbnail image (step S708). The processing to determine the compression rate to be applied in step S708 is described below.

Next, the system control unit 509 generates a DCF header (step S709). That is, the system control unit 509 stores information in, for example, the DCF header section 610 shown in FIG. 5. Specifically, the system control unit 509 sets information including exposure time and shutter speed during photographing in the metadata A (611) for photographing information, parameters, and the like of FIG. 5. The system control unit 509 also calculates the offset values B-G (612-619) corresponding to each image based on the data size of each image generated until the processing of step S709, and sets the pertinent offset value.

Next, the system control unit 509 generates and records a DCF file having, for example, the structure shown in FIG. 5 using the DCF header generated in step S709, and the respective JPEG images and thumbnail images (step S710). That is, the system control unit 509 functions as an image recording unit that records the compressed combined image data, left-eye image data, and right-eye image data in the same image file.

In the case where the system control unit 509 judges in the aforementioned step S704 that an image file for two-dimensional display is to be generated, the process advances to step S709, and the following DCF header preparation processing is executed. The system control unit 509 sets the metadata A (611) for photographing information, parameters, and the like. The system control unit 509 also calculates and sets the offset values B (612) and E (615) corresponding to the combined images.

The system control unit 509 sets a prescribed value indicating that an image is not included in the image data file 600 for offset values C (613), D (614), F (616), and G (617) corresponding to the left-eye images and right-eye images. It is also acceptable to employ a method where the system control unit 509 does not record the offset value item itself. Subsequently, in step S710, the system control unit 509 generates a DCF file composed of a DCF header section, a combined JPEG image, and a combined thumbnail image (step S710), and processing terminates. As the file structure of an image file for two-dimensional display is identical to the structure of a conventional DCF file, description thereof is omitted here.

Figure 7:
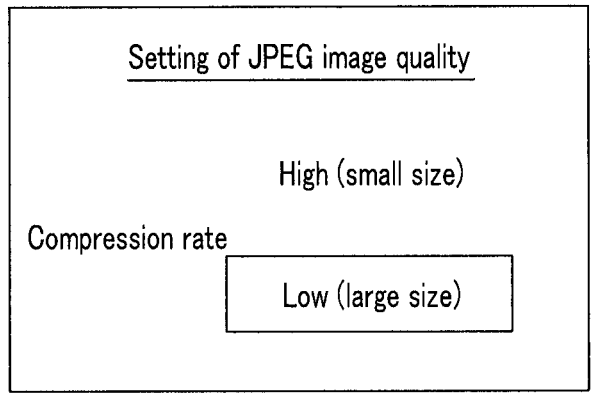
FIG. 7 illustrates an example of a JPEG image compression rate setting screen.

FIG. 7 is a diagram which illustrates an example of a JPEG image compression rate setting screen. The JPEG image compression rate setting screen is a screen on which the compression rate of JPEG images is set. In the case where the user selects the compression rate "high", the system control unit 509 determines that a high compression rate as the compression rate set by the user. The image compression circuit 514 compresses the JPEG images at the high compression rate, whereby JPEG images of small file size are obtained.

In the case where the user selects compression the rate "low," the system control unit 509 determines that low compression rate as the compression rate selected by the user. The image compression circuit 514 compresses JPEG images at the low compression rate, whereby JPEG images of large file size are obtained.

Figure 8:
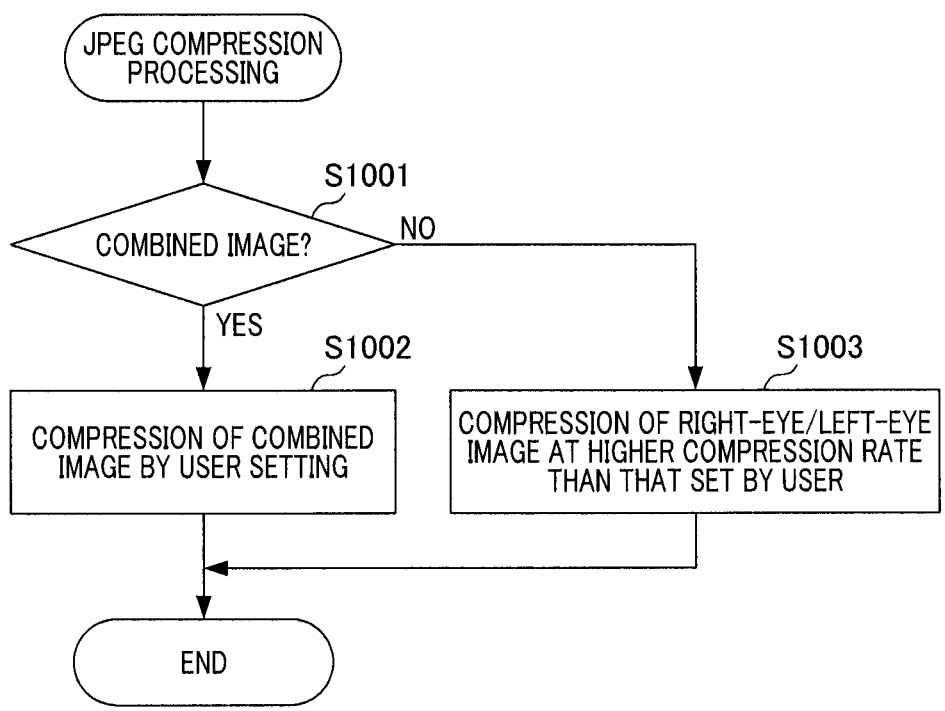
FIG. 8 is a flowchart which serves to describe an example of processing for JPEG compression rate determination.

FIG. 8 is a flowchart which serves to describe the processing that determines the JPEG compression rate in the first embodiment. In the following description, a user conducts selection operations on the JPEG image compression rate setting screen so that a low compression rate is set as the compression rate to be used in compressing JPEG images. First, a system control unit 509 judges the type of JPEG image that is the object of compression processing (step S1001).

In the case where the JPEG image that is the object of compression processing is a "combined image" stored in the combined JPEG image section 631, the system control unit 509 determines that the compression rate set by the user—i.e., a low compression rate—is the compression rate to be used in compressing the pertinent JPEG image. The compression rate set by the user is the first compression rate.

Compared to a right-eye image or left-eye image, a combined image is an image that has no sense of discomfort for the viewer. Accordingly, a combined image has diverse applications, and may be used when conducting two-dimensional display in common applications, or when conducting retouch processing, or when conducting printing output, or the like. Thus, in step S1002, the image compression circuit 514 compresses the combined image at the compression rate set by the user (step S1002). The processing in step S1002 corresponds to the image compression processing in step S703 of FIG. 6 described above.

In the case where the JPEG image that is the object of compression processing is a "left-eye image" stored in the left-eye JPEG image section 632 or a "right-eye image" stored in the right-eye JPEG image section 633, the system control unit 509 performs the following processing. The system control unit 509 determines that a compression rate that is higher than the compression rate set by the user is the compression rate to be used to compress the pertinent JPEG image. The determined compression rate is the second compression rate. The system control unit 509 adopts, for example, a compression rate that is larger by a predetermined value than the compression rate set by the user.

The left-eye image and the right-eye image are used when the imaging apparatus displays a threedimensional image on the display monitor. The resolution of a common display monitor is lower than the resolution of the stored image data. Moreover, as the image data is displayed as a three-dimensional image, there is little obtainment of the effect of recording at a low compression rate even if the image data is stored at a low compression rate. Consequently, the image compression circuit 514 conducts compression at a second compression rate that is higher than the compression rate set by the user (step S1003). The processing in step S1003 corresponds to the image compression processing in steps S706 and S708 of FIG. 6.

The imaging apparatus of the first embodiment performs compression processing of a "combined image" that has diverse applications according to a compression rate set by the user, and performs compression processing of a left-eye image and a right-eye image that have limited applications at a compression rate that is higher than the compression rate set by the user. Therefore, according to the imaging apparatus of the first embodiment, it is possible to achieve efficient file management by recording a combined image, a left-eye image, and a right-eye image in the same file, to minimize the file size of recorded images, and to prevent unnecessary increases in file size.

(Second Embodiment)

Next, the imaging apparatus of a second embodiment is described. A feature of JPEG compression is that even when the same compression parameters are employed, the data size after compression will vary due to the image data content. For example, the data size after compression increases in the case where numerous high-frequency components are contained in the image data, and conversely, the data size after compression decreases in the case where there are few high-frequency components. Accordingly, the imaging apparatus of the second embodiment determines a compression rate for a left-eye image and a right-eye image according to the compression result of a combined image for which compression processing was previously conducted.

Figure 9:
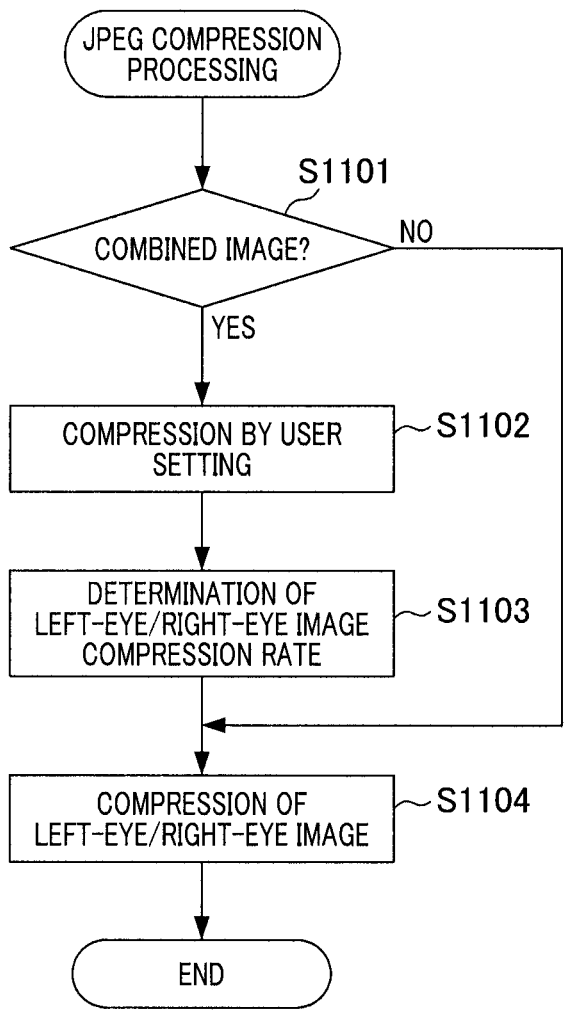
FIG. 9 is a flowchart which serves to describe an example of processing for JPEG compression rate determination.

FIG. 9 is a flowchart which serves to explain an example of processing to determine a JPEG compression rate in the second embodiment. First, the system control unit 509 judges the type of JPEG image that is the object of compression processing (step S1101).

In the case where the JPEG image that is the object of compression processing is a "combined image" stored in the combined JPEG image section 631, the system control unit 509 determines that a compression rate set by the user—i.e., a predetermined first compression rate—is the compression rate to be used in compressing the pertinent JPEG image. The image compression circuit 514 then compresses the combined image at the compression rate set by the user (step S1102).

Next, the system control unit 509 determines in step S1103 a compression rate to be used when compressing a left-eye image and a right-eye image based on the data size after compression of the combined image (step S1103). In this example, the imaging apparatus has stored in advance a table—in which is set correspondence information between a data size after compression and a second compression rate corresponding thereto—in a memory unit. The system control unit 509 references the pertinent table to determine a compression rate corresponding to a data size after compression as the first compression rate. Specifically, the system control unit 509 obtains the data size of combined image data after compression as the combined image data compression result. The system control unit 509 then determines a second compression rate for compression of left-eye image data and right-eye image data based on the data size of the obtained combined image data after compression and the correspondence information in the aforementioned table. Note that the system control unit 509 may also determine a compression rate to be used in compressing a left-eye image and a right-eye image so that, for example, the total data volume of a combined image, a left-eye image, and a right-eye image after compression is equal to or less than a prescribed value.

In the case where the JPEG image that is the object of compression processing is a "left-eye image" stored in the left-eye JPEG image section 632 or a "right-eye image" stored in the right-eye JPEG image section 633, the process advances to step S1103. The system control unit 509 then compresses the left-eye image or right-eye image at the compression rate determined in step S1103 (step S1104).

The imaging apparatus of the second embodiment performs compression processing of a combined image that has diverse applications at a compression rate set by the user, and performs compression processing of a left-eye image and a right-eye image that have limited applications at a compression rate that is adaptively determined according to the compression result of the combined image. Therefore, according to the imaging apparatus of the second embodiment, it is possible to achieve efficient file management by recording a combined image, a left-eye image, and a right-eye image in the same file, and to prevent increases in file size regardless of the data content of a previously compressed combined image.

(Other Embodiments)

With the imaging apparatus of the first and second embodiments, when the all PD raw data combining the right-side PDs and the left-side PDs is input into the imaging signal processing circuit 506, it becomes possible to output combined image data, right-eye image data, and left-eye image data, respectively. With the imaging apparatus of another embodiment, the raw data of left-side PDs and the raw data of the right-side PDs are respectively inputted into the imaging signal processing circuit 506, right-eye image data and left-eye image data are output, and combined image data is output by passing the right-eye image data and the left-eye image data through the image combining circuit 513.

By means also of an imaging apparatus having this configuration, it is possible to store three types of JPEG images with the file structure shown in FIG. 5 in one file, and determine the respective compression rates of the JPEG images by the processing described in FIG. 8 and FIG. 9.

Figure 10:
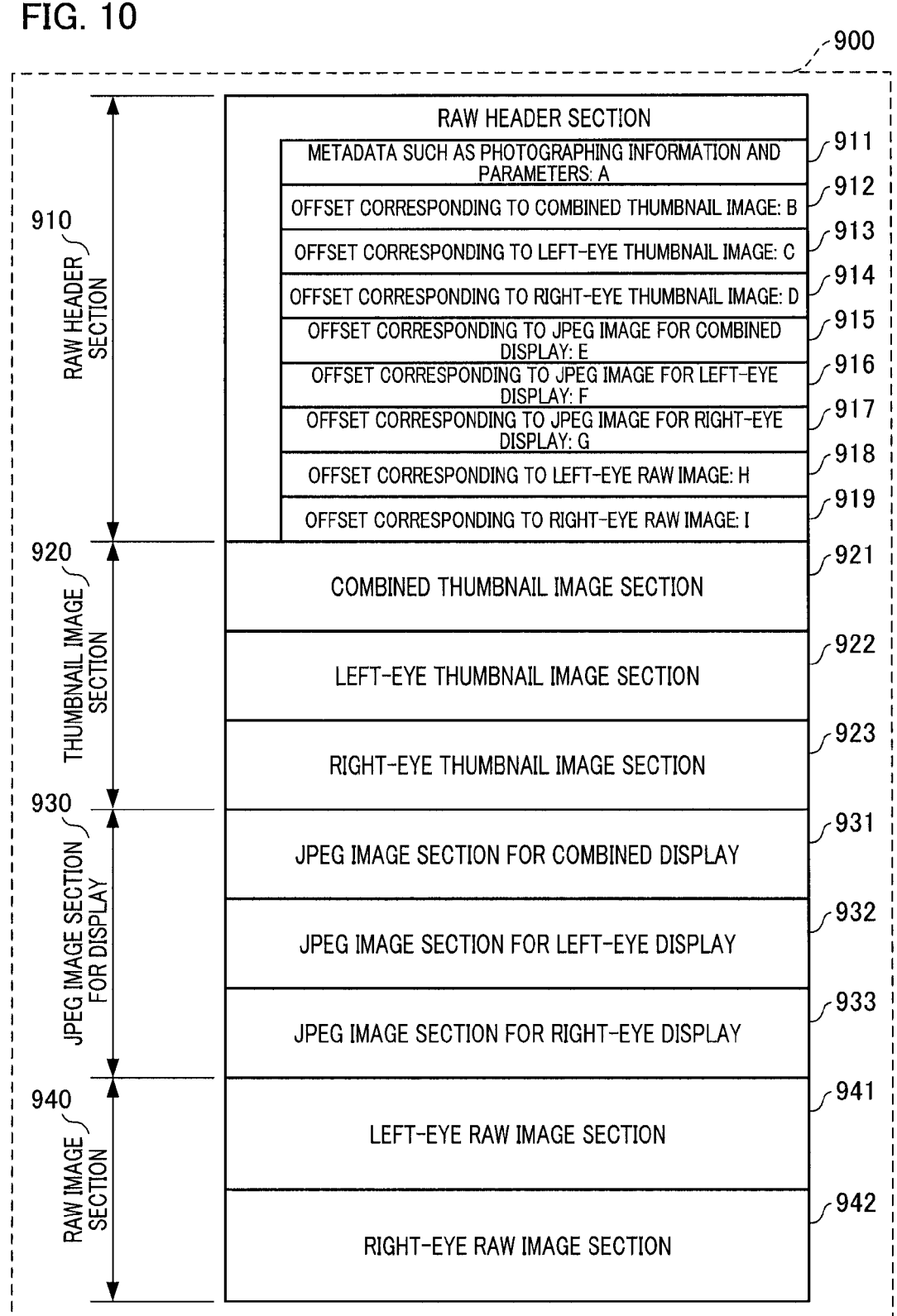
FIG. 10 illustrates an example of a file structure of image data.
Figure 11:
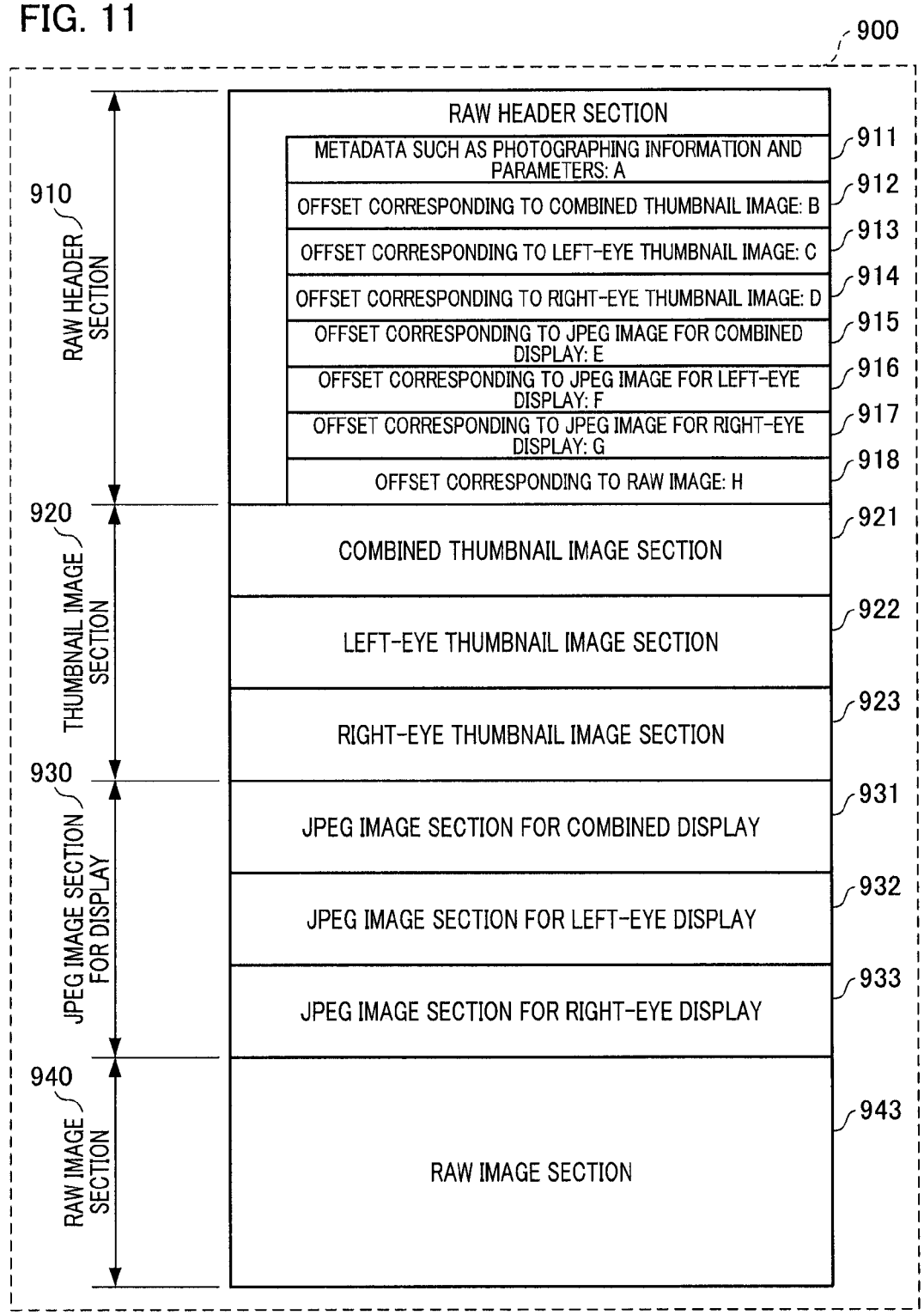
FIG. 11 illustrates an example of a file structure of image data.

With the imaging apparatus of other embodiments, it is also possible to generate a combined image, a right-eye image, and a left-eye image as raw image file structures. FIG. 10 and FIG. 11 are diagrams which illustrate exemplary image data file structures of other embodiments. An image data file 900 shown in FIG. 10 has the respective regions of a raw header section 910, a thumbnail image section 920, a display-use JPEG image section 930, and a raw image section 940.

The raw header section 910 is a region in which raw header information is stored, and is given a predetermined data size. The raw header information contains metadata A (911) such as imaging information and parameters related to the image data stored in the raw image section 940.

The raw header information includes an offset value B (912) corresponding to a combined thumbnail image, an offset value C (913) corresponding to a left-eye thumbnail image, and an offset value D (914) corresponding to a right-eye thumbnail image. The raw header information also includes an offset value E (915) corresponding to a JPEG image for combined display, an offset value F (916) corresponding to a JPEG image for left-eye display, and an offset value G (917) corresponding to a JPEG image for right-eye display. The raw header information further includes an offset value H (918) corresponding to a right-eye raw image, and an offset value I (919) corresponding to a left-eye raw image. The starting positions of the respective image data are specified by these offset values B to I.

The configuration of the thumbnail image section 920 is identical to that of the thumbnail image section 620 shown in FIG. 5. The thumbnail image section 920 has a combined thumbnail image section 921, a left-eye thumbnail image section 922, and a right-eye thumbnail image section 923.

The display-use JPEG image section 930 is a region in which a JPEG image is stored, where the JPEB image is obtained by processing the raw image stored in the raw image section 940 by a prescribed compression method. The display-use JPEG image section 930 has a combined display-use JPEG image section 931, a left-eye display-use JPEG image section 932, and a right-eye display-use JPEG image section 933. The combined display-use JPEG image section 931 records a JPEG image used when performing two-dimensional display. The left-eye display-use JPEG image section 932 and the right-eye JPEG image section 633 respectively record a left-eye image for JPEG display and a right-eye image for JPEG display used when performing three-dimensional display.

The raw image section 940 is a region in which raw data is stored, where the raw data is output so that the output from the imaging element 505 does not degrade. Raw data is data which serves to achieve more sophisticated image editing that conforms to high-quality printing or user purposes by performing reproduction (development) processing of images by means of external devices such as personal computers.

Raw images are not suited to the display of images of large data volume or the like. Accordingly, the display-use JPEG section 930 is used in the case where the imaging apparatus actually performs three-dimensional stereoscopic display. Consequently, the raw image section 940 records the raw data serving as raw material in order to minimize data volume. Specifically, left-eye raw data obtained from left-side PDs is recorded in the left-eye raw image section 941, and right-eye raw data obtained from right-side PDs is recorded in the right-eye raw image section 942.

The imaging apparatus may also store the three types of JPEG images in files having the file structure shown in FIG. 11. In the example shown in FIG. 11, the raw image section 940 has a raw image section 943. The imaging apparatus records raw data that is not divided for left eye use and right eye use in the raw image section 943.

Preferred embodiments of the present invention have been described above, but the present invention is not limited to these embodiments, and is capable of a variety of modifications and alterations within the scope of its intent.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example, via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-001336 filed Jan. 6, 2012, which is hereby incorporated by reference herein in its entirety.

What is claimed is:

1. An imaging apparatus comprising:
    an imaging element provided with pixels which respectively have multiple photoelectric conversion units corresponding to each micro lens;
    an image generation unit configured to generate a single image data of image signals corresponding to one photoelectric conversion unit of each micro lens, and generate combined image data of image signals corresponding to a combination of image signals from a plurality of photoelectric conversion units of each micro lens;
    an image compression unit configured to compress the combined image data at a predetermined first compression rate, and compress the single image data at a second compression rate;
    a determination unit configured to determine the second compression rate when compressing the single image data based on a compression result of the combined image data; and
    an image file generation unit configured to generate an image file that includes the compressed combined image data and/or the compressed single image data.

2. The imaging apparatus according to claim 1,
    wherein the image generation unit generates left-eye image data and right-eye image data for three-dimensional display based on image signals output by the single image data, and generate combined image data for two-dimensional display by additively combining the generated left-eye image data and right-eye image data.

3. The imaging apparatus according to claim 1,
    wherein the determination unit obtains the data size of combined image data after compression as the compression result of the combined image data, and determines the second compression rate when compressing the single image data based on the data size of the obtained combined image data after compression, and correspondence information between data sizes after compression of the combined image data and second compression rates that is stored in advance in a memory unit.

4. A control method of an imaging apparatus comprising an imaging element provided with pixels which respectively have multiple photoelectric conversion units corresponding to each micro lens, the control method comprising:
    generating a single image data of image signals corresponding to one photoelectric conversion unit of each micro lens, and generating combined image data of image signals corresponding to combination of image signals from a plurality of photoelectric conversion unit of each micro lens;
    compressing the combined image data at a predetermined first compression rate;
    determining a second compression rate when compressing the single image data based on a compression result of the combined image data
    compressing the single image data at the second compression rate; and
    generating storing an image file that includes the compressed combined image data and/or the compressed single image data.

5. The imaging apparatus according to claim 2,
    wherein the pixels respectively have a first photoelectric conversion unit for outputting left-eye image signals, and a second photoelectric conversion unit for outputting right-eye image signals, and
    wherein the image generation unit generates the left-eye image data based on the left-eye image signals, and generates the right-eye image data based on the right-eye image signals.

6. The imaging apparatus according to claim 1,
    wherein the image compression unit compresses the combined image data at the first compression rate set by a user, and compress the single image data at the second compression rate that is higher than the compression rate set by the user.

7. The imaging apparatus according to claim 1,
    wherein the image recording unit generates the image file in a DCF image data file format,
    wherein a DFC header information of the image file includes an offset value corresponding to the single image data and an offset value corresponding to the combined image data.

8. The imaging apparatus according to claim 1,
    wherein the image file includes raw data and display-use data of the combined image data, and display-use data of the single image data.

9. The imaging apparatus according to claim 1,
    wherein the image file includes display-use data of the combined image data and a raw data of the single image data.

10. An imaging apparatus comprising:
    an imaging element provided with pixels which respectively have multiple photoelectric conversion units corresponding to each micro lens;
    an imaging element provided with pixels which respectively have multiple photoelectric conversion units corresponding to each micro lens;
    a generating unit configured to generate left-eye image data or right-eye image data for three-dimensional display based on image signals output by the imaging element, and generating combined image data of image signals corresponding to a combination of image signals from a plurality of photoelectric conversion units of each micro lens for two-dimensional display;
    an image compression unit configured to compress the combined image data at a predetermined first compression rate, and compress the left-eye image data or the right-eye image data at a second compression rate;
    a determination unit configured to determine the second compression rate when compressing the left-eye image data or the right-eye image data based on a compression result of the combined image data; and
    an image generation unit configured to generate an image file that includes the compressed combined image data, and/or left-eye image data or right-eye image data.

11. The imaging apparatus according to claim 1, wherein the image compression unit compress the single image data at the second compression rate that is higher than the first compression rate.

12. The imaging apparatus according to claim 1, further comprising:
    an recording unit configured to record the image file on a recording medium.

13. The imaging apparatus according to claim 1, wherein the image file includes image data in JPEG format obtained from the combined image data.

14. The imaging apparatus according to claim 1, wherein the multiple photoelectric conversion units corresponding to each micro lens respectively receive light fluxes that transit different regions of exit pupil of an imaging optical system through the micro lens.

15. The imaging apparatus according to claim 1, further comprising:
   a focus detection unit configured to perform focus detection by using the image signals.

\* \* \* \* \*